United States Patent [19]
Yu

[11] Patent Number: 5,683,827
[45] Date of Patent: Nov. 4, 1997

[54] PROTECTIVE DEVICE FOR PROTECTING INDIVIDUAL BATTERY CELLS IN A BATTERYPACK FROM DAMAGES AND HAZARDS CAUSED BY REVERSE POLARITY DURING DISCHARGE CYCLES

[75] Inventor: Ho-Yuan Yu, Saratoga, Calif.

[73] Assignee: Mobius Green Energy, Inc., Santa Clara, Calif.

[21] Appl. No.: 561,050

[22] Filed: Nov. 20, 1995

[51] Int. Cl.⁶ .................................... H01M 2/34
[52] U.S. Cl. ........................ 429/1; 429/7; 429/90
[58] Field of Search ................... 429/1, 7, 90, 61, 429/49

[56] References Cited

U.S. PATENT DOCUMENTS

| | | | |
|---|---|---|---|
| 4,879,188 | 11/1989 | Meinhold et al. | |
| 5,389,470 | 2/1995 | Parker et al. | 429/90 |
| 5,460,901 | 10/1995 | Syrjala | 429/90 |
| 5,462,814 | 10/1995 | Fernandez et al. | 429/7 |
| 5,496,654 | 3/1996 | Perkins | 429/1 |

FOREIGN PATENT DOCUMENTS

| | | |
|---|---|---|
| 406205538 | 7/1994 | Japan . |
| 0815797 | 3/1981 | Switzerland . |

*Primary Examiner*—M. Nuzzolillo
*Attorney, Agent, or Firm*—Bo-In Lin

[57] ABSTRACT

A rechargeable battery pack which includes several battery cells. Each cell has a positive electrode and a negative electrode connected in series. Each of the battery cells further includes a reverse polarity protection device. The protection device includes a low voltage switch connected between the positive electrode and the negative electrode of the battery cell. The low voltage switch is switched on to become a short circuit when a voltage difference between the positive electrode and the negative electrode for each of the battery cells is lower than a threshold switch-on voltage such that the each of the battery cells is bypassed and protected by conducting a current through the short circuit in the low voltage switch.

8 Claims, 3 Drawing Sheets

PROTECTIVE DEVICE FOR PROTECTING INDIVIDUAL BATTERY CELLS IN A BATTERYPACK FROM DAMAGES AND HAZARDS CAUSED BY REVERSE POLARITY DURING DISCHARGE CYCLES

BACKGROUND OF THE INVENTION

1. Field of the Invention

This invention relates generally to the design and manufacture of batteries. More particularly, this invention relates to an improved design and battery pack configurations for providing protection to a battery and battery pack from being damaged and the potential hazards due to reverse polarity during discharge cycles.

2. Description of the Prior Art

As the rechargeable batteries are becoming more popular and being used increasingly in daily consumer products, potential hazards arise from using these batteries become a major design consideration. Specifically, the most serious concern for these rechargeable batteries come from the facts that the rechargeable batteries are tightly sealed. Meanwhile, during the charging and discharging cycles, electrochemical reactions are carried out inside the battery cells which are of very limited volumes. The internal pressure in these tightly sealed cells can therefore changes rapidly under certain conditions. Sudden pressure increase in the battery cells can cause explosions. The explosion of a battery can cause severe hazards due to its close distance from the users as many of these consumer products are hand-held electronic devices. Additionally, the chemical solution in the cell can cause bodily harms and physical damages to person and properties when explosion occurs.

In order to avoid these hazards, different mechanism and design features are provided to prevent the over pressure of the battery cells. These protective mechanisms and protective features are generally designed for individual battery cells. However, due to the fact that these battery cells are often packaged together and being used as a pack, additional problems may occur in the battery pack that one of these battery cells can encounter a situation causing a reverse polarity to occur in a battery cell.

Please refer to FIG. 1A for a battery pack 10 which includes five battery cells, i.e., cells 20, 30, 40, 50, and 60. Assuming that the capacities of the battery cells are 1200 mAH, 800 mAH, 1150 mAH, 1200 mAH, and 1250 mAH respectively where mAH represents milli-ampere-hour. The battery cell 30 is a degraded cell. Assuming each of these battery cells discharges 800 mAH, then the battery cells 20 to 60 each still has capacity of 400 mAH, 0 mAH, 350 mAH, 400 mAH, and 450 mAH respectively. Suppose that each of these battery cells has an output voltage of 1.2 volts, the battery pack would still have a total of 4.8 volts since the battery cell 30 has a zero volts output voltage (FIG. 1B). Since the battery pack 10 still has an output voltage of 4.8 volts, it is functional and can still discharge. However, upon further discharge, a polarity reverse is generated in the battery cell 30 due to the direction of current in the battery pack 10 (see FIG. 1C).

A polarity reverse when happens to a battery cell can be very dangerous. When the battery cell 30 is in a polarity reverse condition, a large amount of oxygen gas is released due to the occurrence of reverse chemical reactions which leads to generation of oxygen gas in the cell 30. The internal pressure of the cell 30 is thus increased rapidly which leads to an explosion. Under a more fortunate situation when the discharge stops right before the explosion occurs, the battery cell 30 is nevertheless damaged due to the reverse polarity imposed on the electrodes. And, since the capacity of the cell 30 will be degraded further, the situation of reverse polarity will become even worse.

Since most of the protection devices and design features in protecting a battery cell are employed to protect a battery cell from over-pressure, over-charge and over-heat, a protection device for protecting a battery cell from polarity reverse is not yet available. Considering the most common uses of battery cells are in a battery pack configuration, such as the battery pack used in a cellar phone, a notebook computer, an electronic game player or electric vehicles, a protective device to protect a battery cell from polarity reverse is certainly required.

Therefore, a need still exists in the art of battery design and manufacture to provide a protective device to prevent this potential hazardous operational condition. The protective device must provide individual protection for each battery cell in a pack to prevent the occurrence of polarity reverse. Such protective device would preferably simple in design and convenient for manufacture while compatible with operation conditions and environment of a battery pack.

SUMMARY OF THE PRESENT INVENTION

It is therefore an object of the present invention to provide a new protection mechanism and method for preventing individual rechargeable battery cells from polarity reverse thus enabling those of ordinary skill in the art to overcome the aforementioned difficulties and limitations encountered in the prior art.

Specifically, it is an object of the present invention to provide a new protection mechanism and battery pack configuration to prevent individual rechargeable battery cells from polarity reverse by providing a low voltage switching device which is switched on as a short circuit when the voltage difference between the positive terminal and the negative terminal of a battery cell is below a low threshold voltage thus bypassing and protecting the battery cell.

Another object of the present invention is to provide a new protection mechanism and battery pack configuration to prevent individual rechargeable battery cells from polarity reverse by providing a low voltage switching device to each battery cell whereby potential hazards arising from polarity reverse in an individual cell can be eliminated.

Briefly, in a preferred embodiment, the present invention includes a polarity reverse protection device for preventing a rechargeable battery cell in a battery pack from polarity reverse during a discharging cycle. The polarity reverse protection device comprising a low voltage switching means connected between a positive terminal and a negative terminal of the rechargeable battery cell. The low voltage switching means is switched on to become a short circuit when a voltage difference between the positive terminal and the negative terminal is lower than a threshold switch-on voltage whereby the rechargeable battery cell is bypassed and protected by conducting a current through the short circuit in the low voltage switching means.

In another preferred embodiment, it discloses a rechargeable battery pack which includes a plurality of battery cells each having a positive terminal and a negative terminal connected in series. Each of the battery cells in the battery pack further includes a reverse polarity protection device includes a low voltage switching means connected between the positive terminal and the negative terminal of the battery cell. The low voltage switching means is switched on to become a short circuit when a voltage difference between the positive terminal and the negative terminal for each of the battery cells is lower than a threshold switch-on voltage whereby the each of battery cells is bypassed and protected by conducting a current through the short circuit in the low voltage switching means.

It is an advantage of the present invention that it provides a new protection mechanism and battery pack configuration to prevent individual rechargeable battery cells from polarity reverse by providing a low voltage switching device which is switched on as a short circuit when the voltage difference between the positive terminal and the negative terminal of a battery cell is below a low threshold voltage thus bypassing and protecting the battery cell.

Another advantage of the present invention is that it provides a new protection mechanism and battery pack configuration to prevent individual rechargeable battery cells from polarity reverse by providing a low voltage switching device to each battery cell whereby potential hazards arising from polarity reverse in an individual cell can be eliminated.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
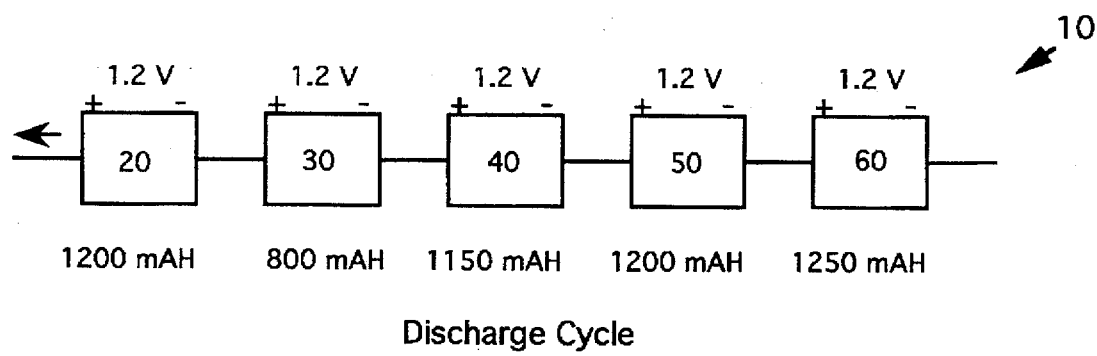
FIGS. 1A to 1C are a functional circuit diagrams for illustrating the conditions that one of the battery cells included in a prior art battery pack can be subject to a reverse polarity condition.
Figure 1B:
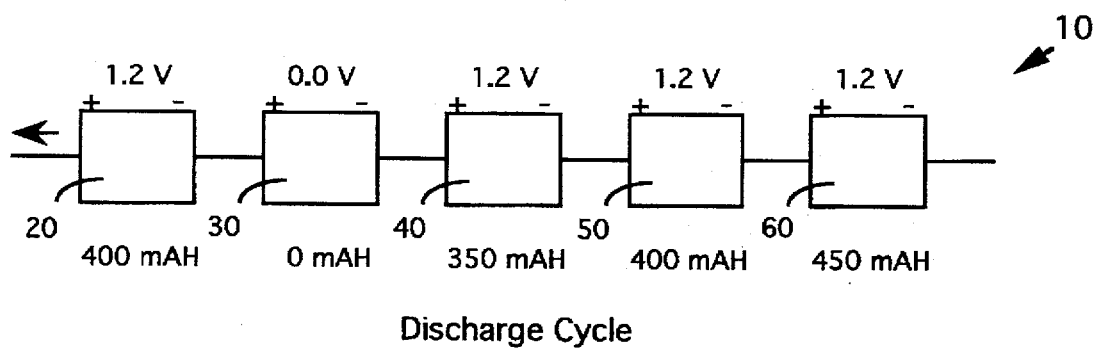
Figure 1C:
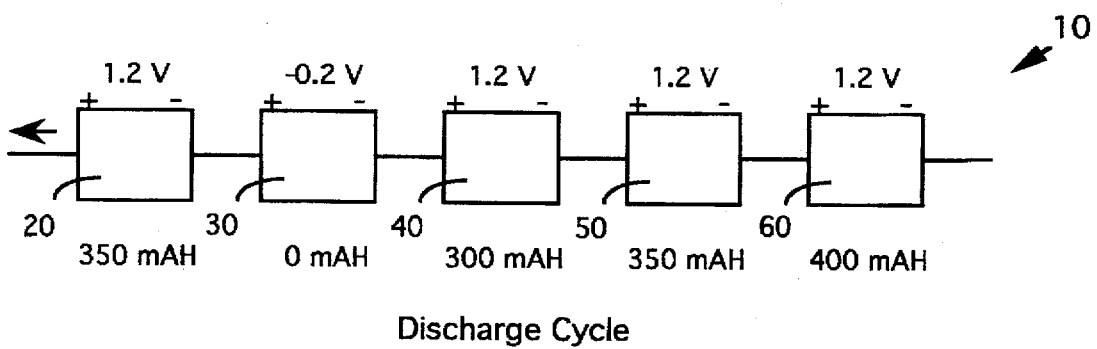
Figure 2:
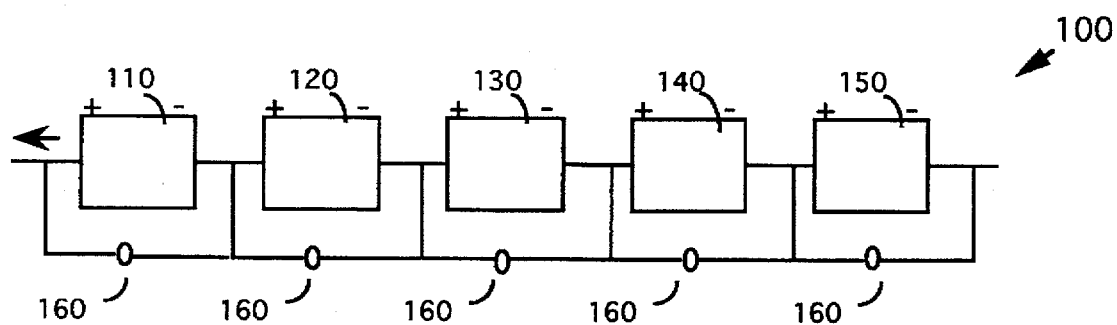
FIG. 2 is a functional circuit diagram showing a new protection device implemented in a battery pack to prevent polarity reverse for each of the battery cells according to the configuration of the present invention.

FIG. 2 is a circuit diagram showing a battery pack 100 includes a set of rechargeable battery cells 110, 120, 130, 140, and 150 wherein each battery cell is provided with protective device 160 of the present invention. In the preferred embodiment, the protective device 160 is connected to the positive terminal and the negative terminal of each battery cells 110 to 150. The protective device 160 is a low voltage switching means which is switched on to become a short circuit when the voltage drop from the positive terminal to the negative terminal is below a low threshold switch-on voltage. When the protective device 160 is turned on as switched by a low voltage drop from the positive to the negative electrode, the low voltage switching means becomes a short circuit A discharge current is thus arranged to conduct through the protective device. The battery cell which is in a condition where the voltage drop from the positive terminal to the negative terminal is lower than a threshold voltage is therefore bypassed as the discharge current is now passing through the low voltage switching means instead of the battery cell, e.g. cell 120. A discharge process where one of the battery cells is subject to a polarity reverse condition as that occurred in the prior art battery pack 10 (FIG. 1C) is therefore eliminated.

Figure 3:
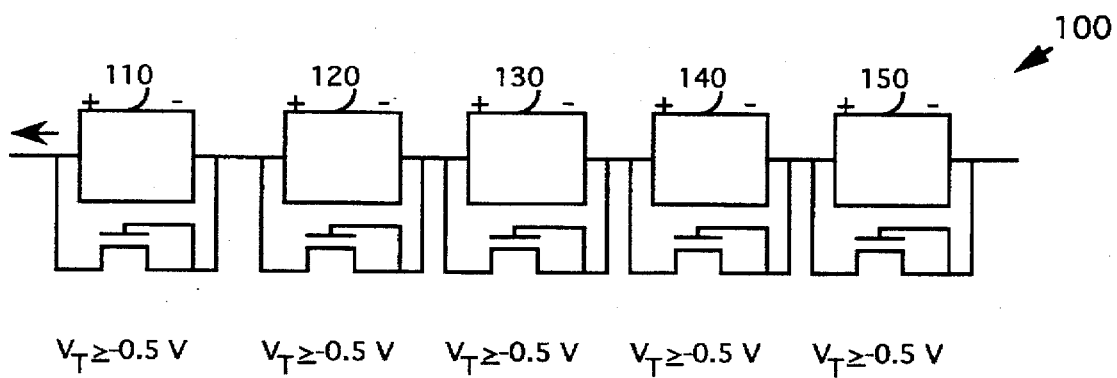
FIG. 3 is a functional circuit diagram showing the circuit implementation for providing a low voltage switching device by the use of a MOSFET transistor as a protection device according to a preferred embodiment of the present invention.
Figure 4:
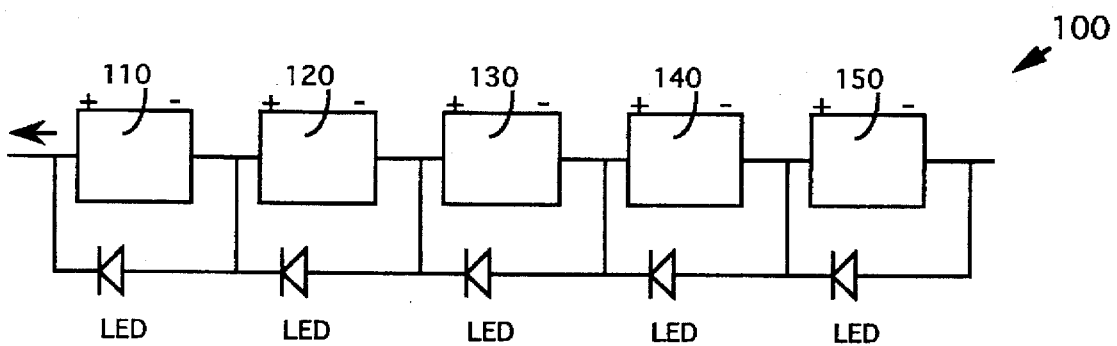
FIG. 4 is a functional circuit diagram showing the low voltage switching circuit provided with an indicating means such as an light emitting diode to indicate a battery is below a threshold low voltage.

FIG. 3 shows a preferred embodiment where the low voltage switching means 160 is a MOSFET (metal oxide semiconductor field effect transistor) where a source (S) to drain (D) is turned on when the voltage, i.e., the voltage drop from the positive terminal to the negative terminal, as imposed on the gate (G) is below a threshold voltage. In an alternate preferred embodiment, as shown in FIG. 4, a light emitting diode (LED) can be employed for connection between the source and the drain. The LED is then used as an indicating means to indicate that one of the battery cells is in a low voltage condition. In addition to the visual indicating means, e.g., LEDs, a low voltage indicating means may be audio warning means. A warning sound is generated by this audio alarm when a low voltage is detected to provide warning to a user that a degraded battery cell is discharged to a very low capacity and could lead to a hazard condition of reverse polarity or battery damage.

The difficulties faced by the prior art rechargeable battery pack are thus resolved by the protective device 160 of the present invention. Soon as a battery cell is below a threshold voltage, the MOSFET transistor is turned on to provide a bypass conducting route to prevent a battery cell from being subjected to a polarity reverse condition. Potential hazards which might be caused by reverse polarity in a battery cell, e.g., pressure increase and explosion, can therefore be prevented. Damages to the battery cells as the results of operating a battery cell under the reverse polarity condition is also eliminated by the use of the protective device 160.

Therefore, the present invention discloses a rechargeable battery pack 100 includes a plurality of battery cells, i.e., cells 110 to 150, each having a positive terminal and a negative terminal connected in series. Each of said battery cells further include a reverse polarity protection device 160 includes a low voltage switching means connected between the positive terminal and the negative terminal of the battery cell. The low voltage switching means 160 is switched on to become a short circuit when a voltage difference between the positive terminal and the negative terminal for each of the battery cells is lower than a threshold switch-on voltage whereby the each of battery cells is bypassed and protected by conducting a current through the short circuit in the low voltage switching means. In an alternate preferred embodiment, the low voltage switching means is a MOSFET transistor wherein a source to a drain of the MOSFET transistor is turned on when the voltage difference between the positive terminal and the negative terminal is lower than a threshold voltage.

Furthermore, the present invention teaches a method of protecting a rechargeable battery pack 100 which includes a plurality of battery cells, e.g., cells 110 to 150, each having a positive terminal and a negative terminal connected in series. The method comprising the steps of: (a) installing on each of the battery cells a reverse polarity protection device 160 includes a low voltage switching means connected between the positive terminal and the negative terminal of the battery cell; and (b) providing to the low voltage switching means 160 a low voltage switch-on circuit which is switched on to become a short circuit when a voltage difference between the positive terminal and the negative terminal for each of the battery cells is lower than a threshold switch-on voltage whereby each of the battery cells is bypassed and protected by conducting a current through the short circuit in the low voltage switching means 160.

Figure 5:
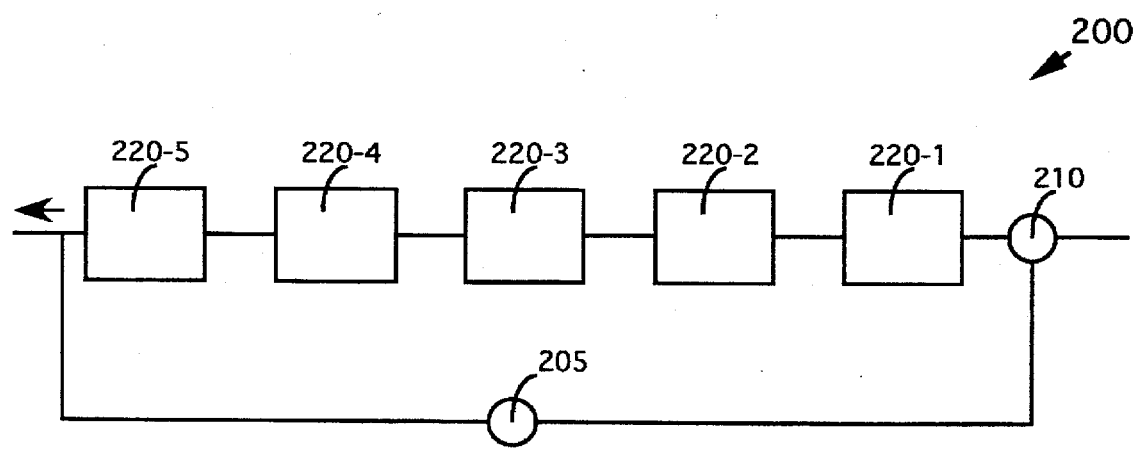
FIG. 5 is a functional circuit diagram showing a battery pack low voltage switching or alarming circuit to switch off the battery pack or FIG. 5 is a functional circuit diagram showing a battery pack low voltage switching or alarming circuit to switch off the battery pack or provide alarm signals when the battery output voltage is below a threshold low voltage.

FIG. 5 shows another battery pack 200 of the present invention provided with a voltage sensor 205 and a battery pack switch-off or alarm device 210. The battery pack 200 includes five battery cells, i.e., battery cell 220-1, 220-2, 220-3, 220-4 and 220-5. Each of these battery cell, under normal operation conditions, generate 1.2 volts, and the battery pack 200 should have a total output voltage of 6.0 volts. However, when one of these cells is gradually degraded and eventually discharged with its capacity totally exhausted, i.e., having a zero volt output, then the battery pack 200 is subjected to the danger of a of reverse polarity. The battery pack switch-off or alarm device 210 has a low voltage threshold voltage set at 4.8 volts. The battery pack switch-off or alarm device 210 can either switch off the battery pack 200 or generate an alarm signals when a low voltage of 4.8 volts is detected by the voltage sensor 205. The battery switch-off or alarm device 210 thus provide a protective function to prevent the battery pack 200 from being damaged by the reverse polarity and the disastrous consequences caused by battery cell explosions which are often caused by a reverse polarity operation condition. This kind of battery pack configuration with the protective device 210 can also be employed in the high power battery packs. These high power battery packs may be used for electrical vehicles, motorcycles, and electrical bicycles. The battery pack switch-off or alarm system 210 may include a transistor switch or a silicon controlled rectifier (SCR). The alarm signals may be an audio alarm signal or a visual alarm signal generated by a light-emitting-diode (LED).

This invention thus teaches a rechargeable battery pack 200 includes a plurality of battery cells 220-1 to 220-5, each having a positive terminal and a negative terminal connected in series. The battery pack 200 further includes a low voltage switch-off means 210 connected between an input terminal and an output terminal of the battery pack 200 for switching off the battery pack when the battery pack generating an output voltage lower than a threshold voltage during discharge for preventing a polarity reverse of the positive terminal and the negative terminal. In a preferred embodiment, the low voltage switch-off means 210 includes a low voltage alarm means connected between an input terminal and an output terminal of the battery pack for providing alarm signals when the battery pack generating an output voltage lower than a threshold voltage during discharge. In another preferred embodiment, the low voltage alarm means includes a light emitting diode for providing a visual alarm signal when the battery pack generating an output voltage lower than a threshold voltage during discharge. In yet another preferred embodiment, the low voltage alarm means 210 includes an audio alarm means for providing a audio alarm signal when the battery pack generating an output voltage lower than a threshold voltage during discharge.

Therefore, the present invention provides a new protection mechanism and method for preventing individual rechargeable battery cells from polarity reverse thus enabling those of ordinary skill in the art to overcome the difficulties and limitations encountered in the prior art Specifically, the new protection mechanism includes a low voltage switching device which is switched on as a short circuit when the voltage difference between the positive terminal and the negative terminal of a battery cell is below a low threshold voltage thus bypassing and protecting the battery cell. With this new protection mechanism and battery pack configuration, each battery cell is individually protected and reverse polarity is prevented such that potential hazards arising from polarity reverse in an individual cell can be eliminated.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A rechargeable battery pack includes a plurality of battery cells each having a first terminal in electrical connection with a positive electrode and a second terminal in electrical connection with a negative electrode wherein said battery cells connected in series and each of said battery cells further comprising:

a polarity reverse protection means connected between said first terminal in electrical connection with said positive electrode and said second terminal in electrical connection with said negative electrode of said battery cell for preventing a polarity reverse of said positive and negative electrodes wherein said low voltage switching means is automatically switched on during a discharging cycle to become a short circuit when a voltage difference between said positive electrode and said negative electrode for each of said battery cells is lower than a threshold switch-on voltage whereby each of said battery cells is bypassed and protected by conducting a single-direction discharging current through said short circuit via said low voltage switching means; and said polarity reverse protection means further includes a low voltage indicating means for automatically providing an indication powered by said single-direction discharging current passing there-through when a voltage difference between said first terminal and second terminal is below said threshold switch-on voltage.

2. The rechargeable battery pack of claim 1 wherein:

said polarity reverse protection means further includes an audio low voltage indicating means for providing an audio alarm powered by said single direction discharging current passing there-through when a voltage difference between said first terminal and said second terminal is below said threshold switch-on voltage.

3. A rechargeable battery pack includes a plurality of battery cells each having a first terminal in electrical connection with a positive electrode and a second terminal in electrical connection with a negative electrode wherein said battery cells connected in and said battery pack further comprising:

a low voltage switch-off means connected between an input terminal and an output terminal of said battery pack for automatically switching off said battery pack when said battery pack generating an output voltage lower than a threshold voltage during a discharge cycle for preventing a polarity reverse between said first terminal and said second terminal in each of said battery cells.

4. The rechargeable battery pack of claim 3 wherein:

said low voltage switch off means includes a transistor low voltage switching means for automatically switching off said battery pack when said battery pack generating an output voltage lower than a threshold voltage during said discharge cycle.

5. The rechargeable battery pack of claim 3 wherein: said low voltage switch off means includes a silicon controlled rectifier low voltage switching means for automatically switching off said battery pack when said battery pack generating an output voltage lower than a threshold voltage during said discharge cycle.

6. A rechargeable battery pack includes a plurality of battery cells each having a first terminal in electrical connection with a positive electrode and a second terminal in electrical connection with a negative electrode wherein said battery cells connected in series and each of said battery pack further comprising:

a low voltage alarm means connected between an input terminal and an output terminal of said battery pack, said low voltage alarming means further includes a low-voltage switch-on means connected in series therein for automatically switching on said low voltage alarm means when said battery pack generating an output voltage lower than a threshold voltage during a discharge cycle for providing alarm signals whereby said low voltage alarm means is turned on only when said output voltage of said battery pack is lower than said threshold voltage during a discharge cycle.

7. The rechargeable battery pack of claim 6 wherein:

said low voltage alarm means includes a light emitting diode for providing a visual alarm signal powered by an alarm current switched on by said low-voltage switch-on means when said battery pack generating an output voltage lower than said threshold voltage during said discharge cycle.

8. The rechargeable battery pack of claim 7 wherein:

said low voltage alarm means includes a audio alarm means for providing an audio alarm signal powered by an alarm current switched on by said low-voltage switch-on means when said battery pack generating an output voltage lower than said threshold voltage during said discharge cycle.

* * * * *